(12) United States Patent
Wang et al.

(10) Patent No.: US 6,556,721 B1
(45) Date of Patent: Apr. 29, 2003

(54) METHOD FOR IMAGE AUTO-CROPPING

(75) Inventors: Ching-hsien Wang, Miao Li (TW); Wei-shu Shiu, Ta Tung (TW); Ming-jer Wu, Tainan (TW)

(73) Assignee: Mustek Systems Inc., HsIn-Chu (TW)

( * ) Notice: Subject to any disclaimer, the term of this patent is extended or adjusted under 35 U.S.C. 154(b) by 0 days.

(21) Appl. No.: 09/479,306

(22) Filed: Jan. 7, 2000

(51) Int. Cl.[7] .................................................. G06K 9/20
(52) U.S. Cl. ...................................... 382/282; 382/319
(58) Field of Search ................................. 382/282, 219, 382/312, 319, 273, 283; 345/620, 621, 622, 624, 627; 358/538, 537, 473

(56) References Cited

U.S. PATENT DOCUMENTS

| 5,880,858 A | * | 3/1999 | Jin | 358/487 |
| 5,978,519 A | * | 11/1999 | Bollman et al. | 382/282 |
| 6,144,467 A | * | 11/2000 | Tsai | 358/486 |
| 6,178,015 B1 | * | 1/2001 | Lee et al. | 358/486 |

* cited by examiner

*Primary Examiner*—Jon Chang
*Assistant Examiner*—Virginia Kibler
(74) *Attorney, Agent, or Firm*—Birch, Stewart, Kolasch & Birch, LLP

(57) ABSTRACT

The present invention provides a method for automatically cropping a scanned image having irregular boundaries. A pattern sheet is provided on the bottom surface side of the cover of the optical scanner. The pattern sheet is defined by multiple pattern units for serving as referential coordinates. When the scanner is initialized, the pattern sheet is pre-scanned to generate a pre-scanned image. The pre-scanned image of the pattern sheet will be analyzed to get the referential data, including the index, the referential intensity level, and the pixel-positions of each pattern unit. The referential data of each pattern unit will be stored in a database. When auto-cropping an area of interest (AOI) from a pre-scanned image, the pre-scanned image of the original will be logically divided into multiple document blocks according to the positions of the pattern units. Then, compare each document block with its correspondent pattern unit to determine if the document block contains AOI data. After finishing the comparison, group the adjacent document blocks recorded as a region. Finally, crop each region formed by its border line to obtain the AOI.

12 Claims, 4 Drawing Sheets

METHOD FOR IMAGE AUTO-CROPPING

BACKGROUND OF THE INVENTION

A. Field of the Invention

The present invention relates to a method for image auto-cropping, especially to a method for auto-cropping images with irregular boundaries.

B. Description of the Prior Art

The optical image scanners available in the market usually provide a pre-scan function which is capable of automatically cropping the area of interest (AOI) from the scanned image by a bounding rectangle. For instance, cropping a star figure as illustrated in FIG. 1, the actual area cropped is a rectangular area rather than the target star figure. Thus, the data required for image processing will inevitably include a great amount of undesirable data. The user would have to manually delete the background image data in the area cropped to get the target star figure. Moreover, since the current cropping algorithms are still not efficient enough, therefore the speed of auto-cropping is time-consuming.

For artistic figures, such as the figures scanned for Internet applications, the figures are usually not in uniform shape. If an artistic figure is cropped using the conventionally method, then the AOI will be selected by a bounding rectangle. Then, the background image has to be converted into uniform color. After that, the user may apply an application tool to manually set the background image as transparent. Finally, the artistic figure can be stored in a file format accessible for Internet applications. Thus, the image processing for the auto-cropped image has to be processed by experienced software engineers. For large volume scanning and auto-cropping, it is desirable to provide a function in a scanner application software for auto-cropping an artist figure directly from its border, thereby to enhance productivity, popularity and save the cost.

SUMMARY OF THE INVENTION

Accordingly, it is a primary object of the present invention to provide a method for auto-cropping an image with irregular boundaries, thereby to enhance the productivity and promote the functions of an optical scanner.

It is another object of the present invention to provide an efficient method for image auto-cropping which can precisely crop the area of interest from its border line, thereby to reduce the amount of background data required for further processing and thus improve the efficiency of auto-cropping.

In accordance with the present invention, a method for automatically cropping the area of interest from a pre-scanned image is provided. A pattern sheet is provided on the bottom surface side of the cover of the optical scanner. The pattern sheet is defined by multiple pattern units for serving as referential coordinates. When the scanner is initialized, the pattern sheet is pre-scanned to generate a pre-scanned image. The pre-scanned image of the pattern sheet will be analyzed to get the referential data, including the index, the referential intensity level, and the pixel-positions of each pattern unit. The referential data of each pattern unit will be stored in a database. When auto-cropping an area of interest (AOI) from a pre-scanned image, the pre-scanned image of the original will be logically divided into multiple document blocks according to the positions of pattern units. Then, compare each document block with its correspondent pattern unit to determine if the document block contains AOI data. If the intensity-level difference between the document block and its correspondent pattern unit is larger than a default value, then record the index of the document block. After finishing the comparison, group the adjacent document blocks recorded as a region. Finally, crop each region formed from its border line to obtain the desired AOI.

BRIEF DESCRIPTION OF THE DRAWINGS

These and other objects and advantages of the present invention will become apparent by reference to the following description and accompanying drawings wherein:

FIG. 2A is a schematic diagram showing an example of a pattern sheet according to a preferred embodiment of the present invention.

FIG. 2B is a schematic diagram showing an enlarged view of the pattern unit of the pattern sheet as illustrated in FIG. 2A.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

Figures 2A, 2B:
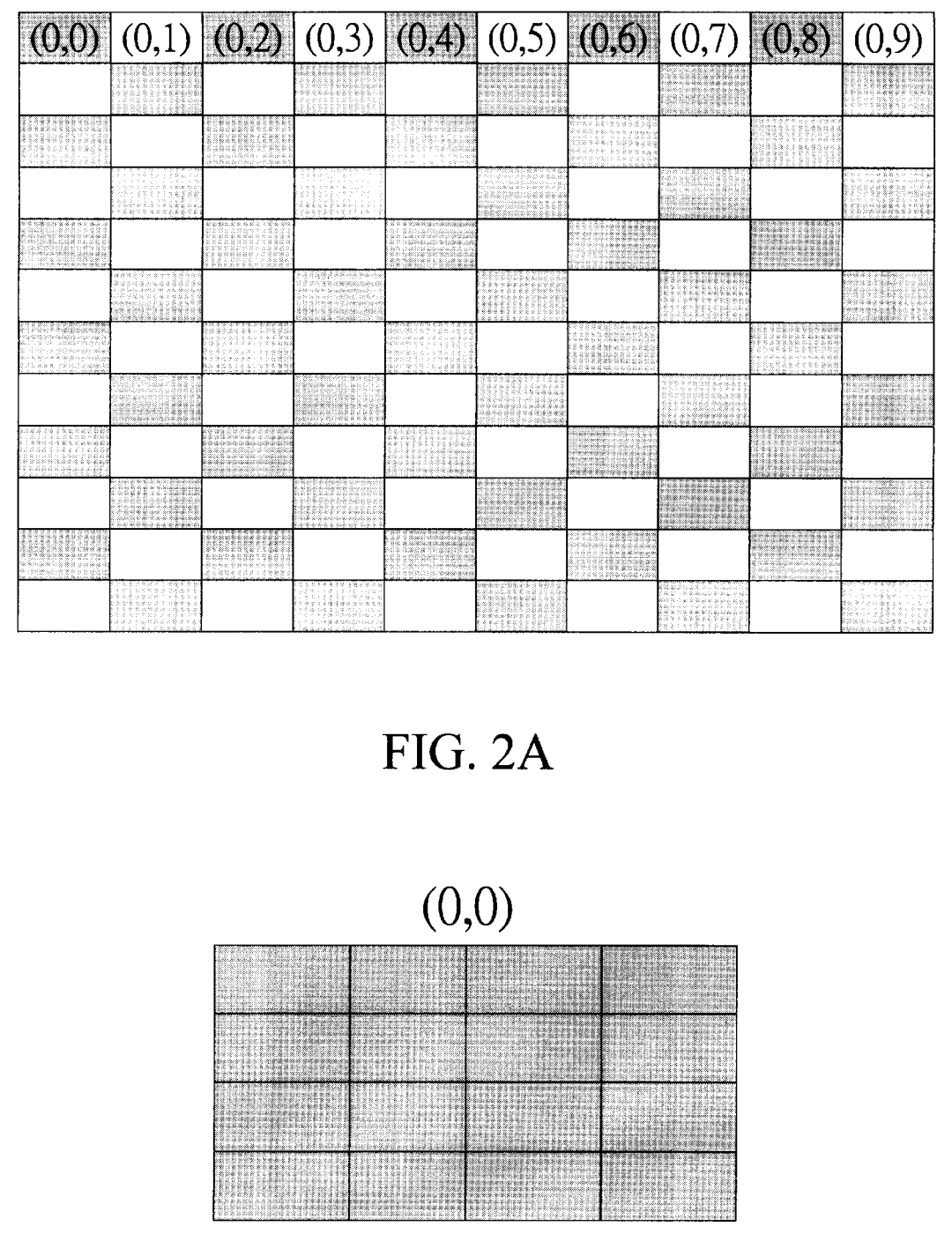

To solve the above-mentioned problems, the present invention provides a pattern sheet on the bottom surface side of the cover of an optical scanner. The pattern sheet is large enough to cover the entire sheet table and serve as a background for an original. The pattern sheet consists of multiple pattern units arranged in a well-aligned manner as illustrated in FIG. 2A. The pattern units are uniform, identical and only different in intensity levels. Refer to FIG. 2B for showing an example of the pattern unit which consists of multiple pixels, an index (0,0), and an intensity level. The purpose of the pattern units is to serve as the referential coordinates for looking for an AOI. The pattern sheet as illustrated in FIG. 2A is for the exemplary purpose only and should not be considered as a limitation. For the convenience of comparison, the patterns should have overlapped portions as less as possible so that the AOI can be precisely cropped.

Due to the assembly or manufacturing errors, the positions of the pattern units arranged in the pattern sheet may be slightly different on the optical scanners. To obtain the precise positions for each pattern unit on the pattern sheet, the pattern sheet must be pre-scanned and analyzed when the optical scanner is first initialized. The pre-scanned image of the pattern sheet is then read and analyzed to find the arrangement of the patterns in the pattern sheet. Then, index each pattern unit and compute the pixel-positions, and the referential intensity levels of the each pattern unit. The results are then stored in a database.

Figure 1:
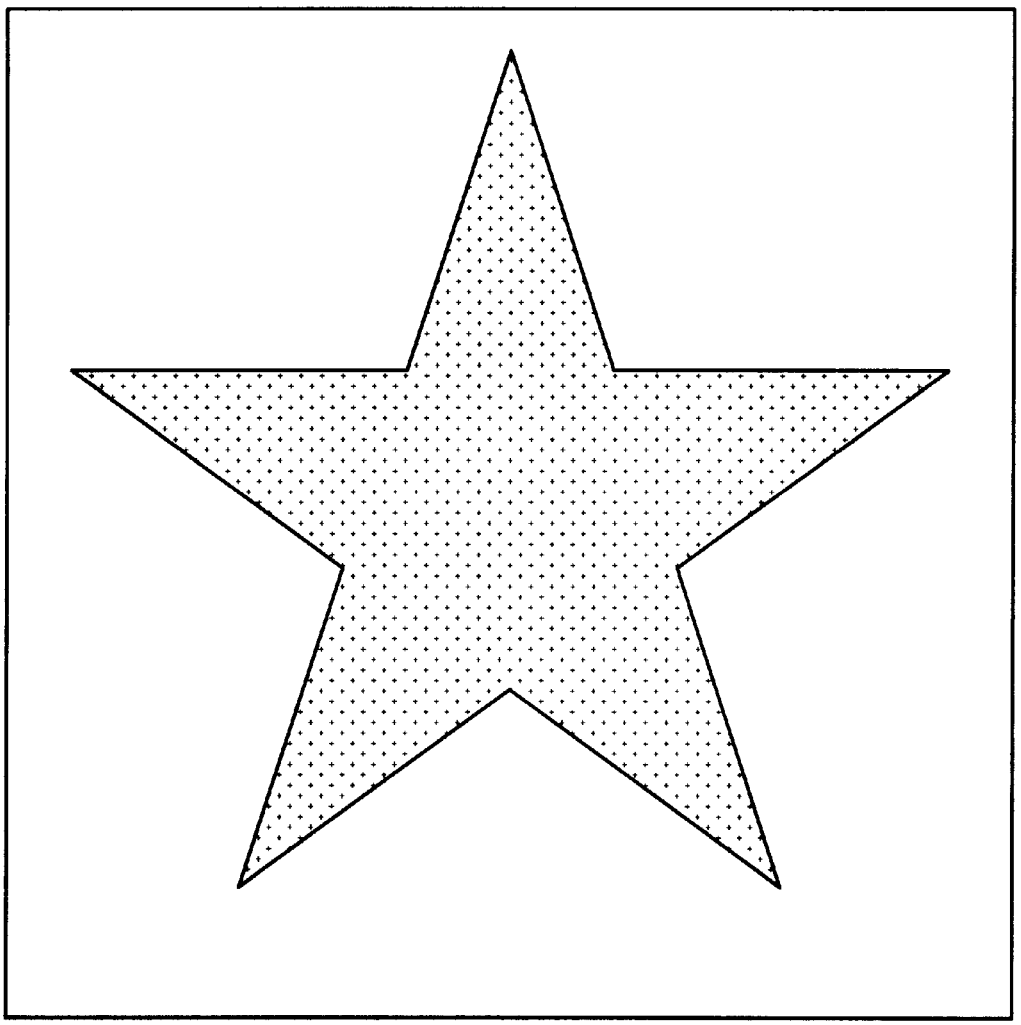
FIG. 1 is a schematic diagram showing the conventional method for auto-cropping an image by circumscribing the AOI with a bounding rectangle.
Figure 3:
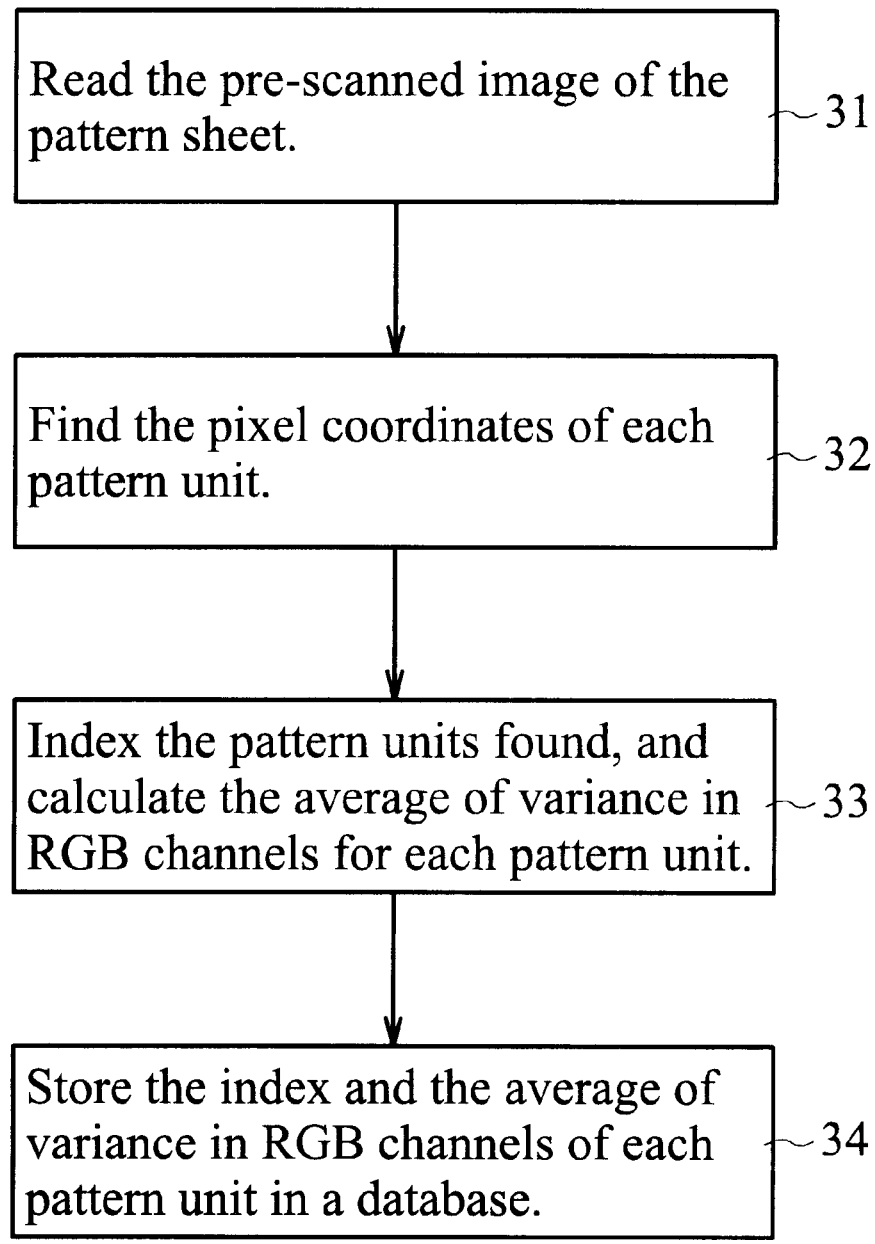
FIG. 3 is a flowchart showing the method for building a database for the pattern sheet according to a preferred embodiment of the present invention.

With reference to FIG. 2A, the pattern sheet database can be stored following the steps as illustrated in FIG. 3.

Step 31: Pre-scan the pattern sheet by a low resolution, such as 50 dpi, to generate a pre-scanned image of the pattern sheet.

Step 32: Analyze the pattern arrangement of the pattern sheet and calculate the pixel-positions of each pattern unit. There are several algorithms known to those skilled in the art to find the arrangement of patterns. For instance, select a sample region from the upper leftmost area from the pre-scanned image of the pattern sheet. And then find the area with the lowest gray level from the sample region. The area with the lowest gray level will be defined as a pattern unit. Since each pattern unit is identical in size, so the remaining pattern units can be easily defined based on the size of the pattern unit first found. Then, find the area with a higher gray level using the same approach (suppose there are only two gray levels).

Step 33: Index each pattern unit and calculate the referential intensity levels of each pattern unit. Since each pattern unit consists of multiple pixels, so the average of variance in Red, Green, Blue (RGB) channels of each pattern unit is set as the referential intensity level of a pattern unit. For instance, if each pattern unit consists of 20 pixels, the referential intensity level of a pattern unit can be obtained by summing the RGB values respectively and then dividing each sum of RGB channels by 20.

Then, each pattern unit is assigned with an index for the convenience of comparison. Refer to FIG. 2B for an example. Each pattern unit is assigned with an index (i,j), where i represents the row position and j the column position based on the patterns. Since the area of the pattern unit is larger than the a pixel, so the comparisons can be performed more efficiently.

Step 34: Then, store the referential data of a pattern sheet, including the index, the referential intensity level, and the pixel-positions of each pattern unit.

Thus, the database of the pattern sheet can be established. The database can be built at the time when the optical scanner is first initialized. Then, the scanner can perform auto-cropping by comparing the pre-scanned image of the original with the referential data of the pattern sheet stored in the database.

The auto-cropping method of the present invention is based on the comparison between the pre-scanned image of the original and the referential data of the pattern sheet. The present invention allows the user to select either cropping the AOI by a bounding rectangle or cropping the AOI by its border line.

Figure 4:
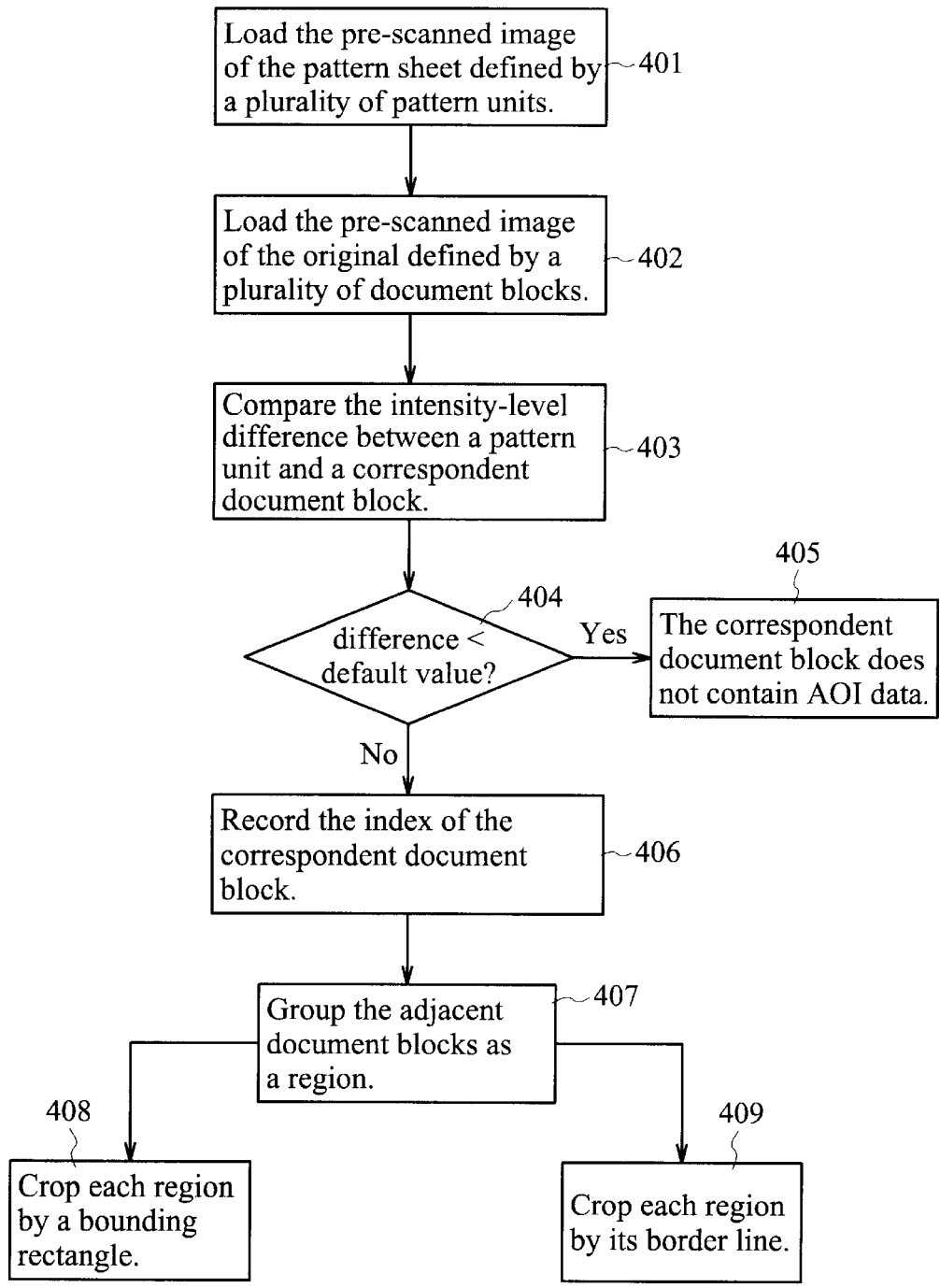
FIG. 4 is a flowchart showing the method for auto-cropping an area of interest from a pre-scanned image according to a preferred embodiment of the present invention.

The auto-cropping method of the present invention is illustrated in FIG. 4:

Step 401: Retrieve the referential data of the pattern sheet stored in the database.

Step 402: Pre-scan the original by the same resolution as that for scanning the pattern sheet, such as 50 dpi, to generate the pre-scanned image of the original. The pre-scanned image of the original is logically divided by multiple document blocks according to the pixel-positions of the pattern units.

Step 403: Compare the difference between a document block and its correspondent pattern unit. The object of the comparison is to determine the positions of the AOI in the pre-scanned image of the original. The scanned image of the original will reveal the feature of a predetermined pattern on the background uncovered by the AOI. Accordingly, the positions of the AOI can be determined from the document block which does not show any feature of the predetermined pattern. Moreover, since the intensity levels of the pixels in the same pattern unit are very close, so the position of the AOI in the document block can be easily determined.

The comparison between a pattern unit and a correspondent document block is performed in terms of the intensity-level difference.

Step 404: If the intensity level difference between the pattern unit and the correspondent document block is less than a default value, it is more likely that the document block does not contain AOI data, so go to step 405. If not, go to step 406.

Step 405: Determine the document block does not contain the AOI data.

Step 406: If the intensity-level difference between the pattern unit and the correspondent document block is larger than a default value, it indicates that the document block contain the AOI data. So, record the index of that document block.

Step 407: After the comparison between each pattern unit and its correspondent document block has all been done, group each adjacent document blocks recorded as the same region. Thus, if three images have been scanned at the same time, three regions will be formed.

Step 408: If the user chooses to crop the AOI by a bounding rectangle, then compute the position of the bounding rectangle by reference to the indices of the upper leftmost pattern unit and the bottom rightmost pattern unit. Then, find the pixel-positions of the pattern units forming as the bounding rectangle to crop the AOI with a rectangle.

Step 409: If the user selects to crop the AOI by its border line, then crop each region formed by its border line.

After that, the edge of the cropped regions can be refined by performing transparent processing to the document blocks near the border line of the regions to delete the undesired background. The size of the detailed portions near the border line of the regions depend on the size of the pattern unit. If the size of the pattern unit is small, the detailed portions near the border line will be finer. Thus, the data which require further processing is also smaller. However, if the pattern unit is too small, it would be difficult to distinguish the background image from the AOI data.

Accordingly, the present invention can be applied to various figures with irregular boundaries. The functions of the scanner can be promoted to scan any artistic figures. The scanner is applicable to crop the artistic figures for Internet application, such as homepages, and other image processing applications. Moreover, the present invention can scan multiple images at one time, thereby to improve the efficiency of the scanner.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A method for auto-cropping an image for an optical scanner, comprising the steps of:

building a database comprising the referential data of a pattern sheet, said pattern sheet defined by pattern units;

reading a pre-scanned image of an original defined by document blocks according to the positions said of pattern units;

comparing the intensity-level difference between each of said pattern units and each of correspondent document blocks;

determining a document block does not contain area of interest (AOI) data when the intensity-level difference between said document block and a correspondent pattern unit does not exceed a predetermined value;

recording the index of said document block when the intensity-level difference between said document block and said correspondent pattern unit is larger than a predetermined value;

grouping adjacent document blocks recorded as a region; and cropping each region by its border line.

2. The method as claimed in claim 1, wherein said step of building a database comprises the steps of:

providing said pattern sheet on the bottom surface side of the cover of said optical scanner;

performing a pre-scanning procedure on said pattern sheet to generate a pre-scanned image of said pattern sheet;

analyzing the patterns of said pattern sheet and finding the pixel-positions of said pattern units;

indexing said pattern units and computing the referential intensity levels of said pattern units; and storing the index and referential intensity levels of each of said pattern units.

3. The method as claimed in claim 1, wherein said referential data of said pattern sheet comprises:

the referential intensity level, the index, and the pixel-positions of each of said pattern units.

4. The method as claimed in claim 2, wherein said pre-scanned image of said original and said pre-scanned image of said pattern sheet are read by the same resolution.

5. The method as claimed in claim 3, wherein said referential intensity level is the average of variance in RGB channels.

6. The method as claimed in claim 3, wherein the area defined by each of said pattern units is larger than a pixel.

7. The method as claimed in claim 3, wherein said pixel-positions of each of said pattern units are the coordinates of each pixel in the same pattern unit.

8. The method as claimed in claim 1, further comprising the step of:

applying transparent processing to the document blocks near said border line of said each region to delete background image.

9. A method for auto-cropping an image for an optical scanner, comprising the steps of:

providing a pattern sheet on the bottom surface side of the cover of said optical scanner, said pattern sheet defined by pattern units;

performing a pre-scanning procedure on said pattern sheet to generate a pre-scanned image of said pattern sheet;

analyzing the patterns of said pattern sheet and finding the pixel-positions of said pattern units;

indexing said pattern units and computing the referential intensity levels of said pattern units;

storing the index and referential intensity levels of each of said pattern units;

reading a pre-scanned image of an original defined by document blocks according to the positions of said pattern units;

comparing the intensity-level difference between each of said pattern units and each of correspondent document blocks;

recording the index of said document block when the intensity-level difference between said document block and said correspondent pattern unit is larger than a predetermined value;

grouping adjacent document blocks recorded as a region; and cropping each region by its border line.

10. The method as claimed in claim 9, further comprising the step of:

determining a document block does not contain area of interest (AOI) data when the intensity-level difference between said document block and a correspondent pattern unit does not exceed a predetermined value.

11. The method as claimed in claim 9, further comprising the step of:

applying transparent processing to the document blocks near said border line of said each region to delete background image.

12. The method as claimed in claim 9, wherein said pre-scanned image of said original and said pre-scanned image of said pattern sheet are read by the same resolution.

* * * * *